Nov. 16, 1926.
A. SEIDEL
1,606,814
CONNECTING DEVICE
Filed Nov. 19, 1925
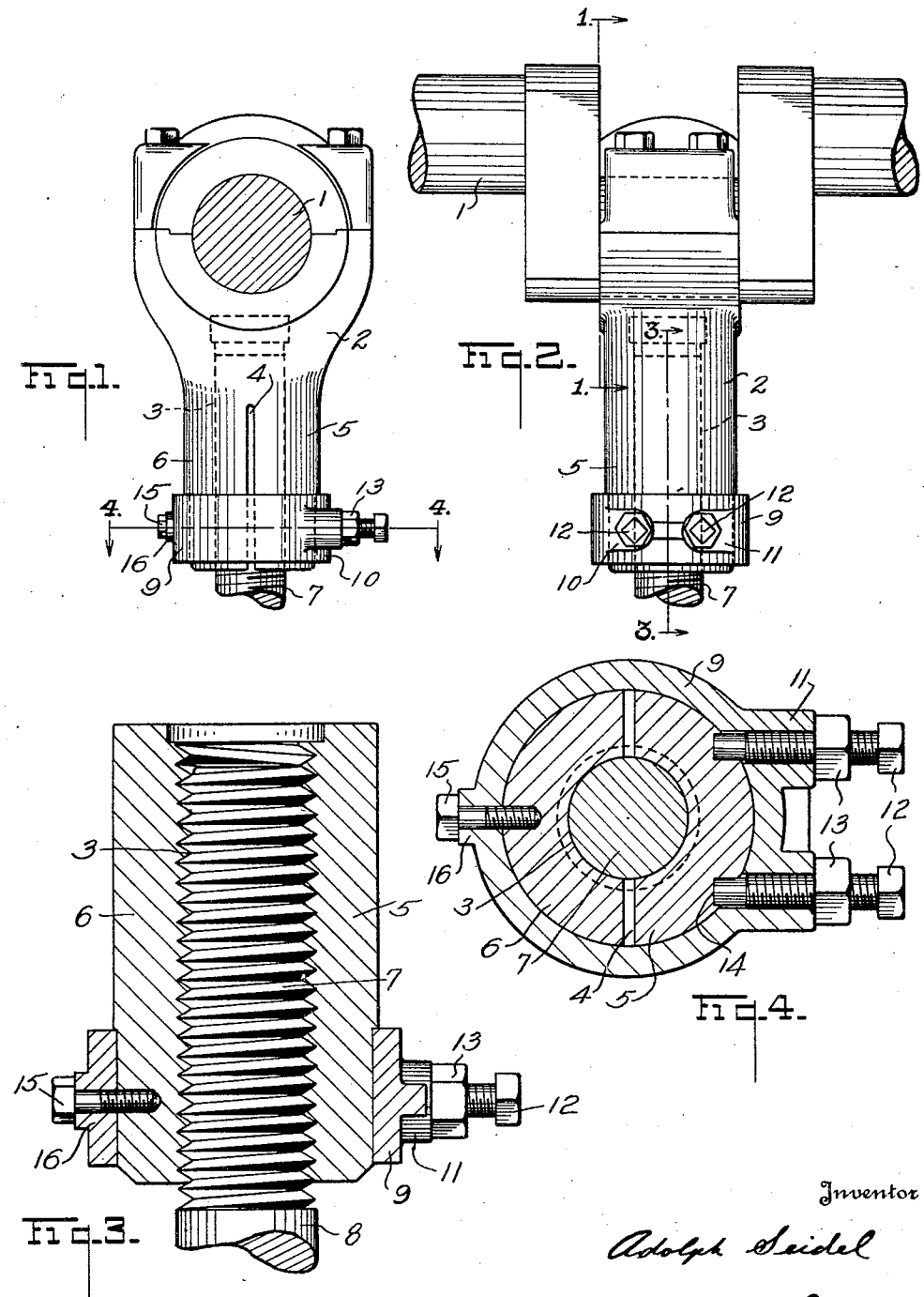
Inventor
Adolph Seidel
By Owen & Owen
Attorneys Patented Nov. 16, 1926.

1,606,814

UNITED STATES PATENT OFFICE.

ADOLPH SEIDEL, OF TOLEDO, OHIO, ASSIGNOR TO THE TOLEDO MACHINE & TOOL COMPANY, OF TOLEDO, OHIO, A CORPORATION OF OHIO.

CONNECTING DEVICE.

Application filed November 19, 1925. Serial No. 69,965.

This invention relates to devices for securely connecting together telescoping members; and objects of this invention are to provide a simple and improved device for rigidly joining tubular members in such a manner that liability of accidental disengagement is prevented; and to provide a reliable and improved device for securely binding a longitudinally split end portion of a substantially cylindrical member to a rod or shaft. Other objects and advantages will hereinafter appear.

The invention is shown by way of illustration in the accompanying drawings, in which:

Fig. 1 is a side elevation of a pitman having my improved securing device attached thereto, with parts broken away and a part in section on the line 1—1 in Fig. 2; Fig. 2 is a different elevation thereof with parts broken away; Fig. 3 is an enlarged section on the line 3—3 of Fig. 2; and Fig. 4 is an enlarged cross-section on the line 4—4 of Fig. 1.

The illustrated embodiment of the invention comprises a crank shaft 1 to which is connected a pitman head 2, which is pivotally connected to the crank in any suitable manner. The outer end of the head 2 is formed with a bore 3, and is split longitudinally at 4 providing leg portions 5 and 6. The bore 3 of the head is in this instance screw threaded to receive the threaded end portion of a pitman rod 8.

By thus adjustably connecting the pitman rod 8 to the head 2, the length of the pitman may be readily varied, and such length adjustment for example is particularly useful in presses in which it is desired to connect the die-carrying plunger in an adjustable manner to the operating crank shaft, as will readily be understood by those skilled in the art. It will be apparent, however, that difficulty is encountered in providing a reliable connection between the two pitman parts so that rigidity will be maintained at all times, notwithstanding the vibration of the machine and the continuous strain on the parts.

In accordance with this invention, a reliable connection is obtained and, as shown, a sleeve 9 surrounds the longitudinally split end portion of the pitman head 2 and is provided with a pair of bosses 10 and 11 adapted to receive screws 12, each screw being provided with a lock nut 13 for securely holding it in adjusted position. The inner ends of the screws 12 are adapted to project into sockets 14 formed in the section 5 of the pitman head and to rotate therein. In order to securely bind the end portion of the pitman head to the threaded end of the rod 8 the screws 12 are tightened so that the sections 5 and 6 are forced closely together, thereby preventing liability of the rod 8 becoming loosened from the head 2 during the operation of the machine.

In order to hold the sleeve 9 in proper position at all times relative to the pitman head 2 a screw 15 extends through a boss 16 formed on the sleeve 9 on the side opposite the bosses 10 and 11 and is in threaded engagement with the sections 6 of the end portion of the head 2. It will thus be seen that by means of the screw 15 the sleeve 9 is held in engagement with the end portion of the pitman head 2 after the screws 11 are loosened to permit length adjustment of the parts.

The above described construction is decidedly simple and may be manufactured at a comparatively low cost. An outstanding feature resides in the ease by which length adjustment of the pitman may be effected, it being merely necessary to apply a wrench to loosen the screws 12 whereupon the pitman rod may be screwed into or out of the pitman 2. By employing a pair of screws 12 an equalized pressure or squeezing is imparted to the split end portions 5 and 6 of the pitman. As a result the threaded end portion 7 is firmly gripped and any tendency of the pitman rod 8 to disengage itself is prevented because of the vise-like interlocking engagement of the parts.

An important feature of the invention resides in the provision of the ring 9 which surrounds the split end portion of the pitman head and prevents this split portion from spreading in the event that one or both screws 12 are not tightened or become loose in the operation of the machine. As above noted, even though the screws 12 become loose the screw 15 will prevent the ring 9 from slipping from the split portion.

It will be seen that I have provided a construction which satisfies the objects enumerated above and one which constitutes a valuable advance in the art. While I have shown the invention in a certain physical embodiment, it is to be understood that modifications of the structure shown may be made by those skilled in this art without departing from my invention as expressed in the following claim.

What I claim as new and desire to secure by Letters Patent is:—

The combination with an internally threaded tubular member having a longitudinally split end portion, a rod threaded in said member, and means for securing said split end portion to the rod comprising a sleeve surrounding said end portion, a pair of bosses on one side of said sleeve, screws in said bosses engaging one section of said end portion for binding said end portion and rod together, and a screw on the opposite side of said sleeve engaging the other section of said end portion for holding said sleeve in position.

In testimony whereof I have hereunto signed my name to this specification.

ADOLPH SEIDEL.